(12) United States Patent
Toyoshima et al.

(10) Patent No.: US 9,331,340 B2
(45) Date of Patent: May 3, 2016

(54) CATALYTIC INK PREPARATION METHOD

(75) Inventors: Kenichi Toyoshima, Yokohama (JP);
Norifumi Horibe, Fujisawa (JP);
Takayuki Terasaki, Yokohama (JP)

(73) Assignee: NISSAN MOTOR CO., LTD.,
Yokohama-Shi, Kanagawa (JP)

(*) Notice: Subject to any disclaimer, the term of this patent is extended or adjusted under 35 U.S.C. 154(b) by 124 days.

(21) Appl. No.: 14/346,792

(22) PCT Filed: Aug. 14, 2012

(86) PCT No.: PCT/JP2012/070660
§ 371 (c)(1),
(2), (4) Date: Mar. 24, 2014

(87) PCT Pub. No.: WO2013/046971
PCT Pub. Date: Apr. 4, 2013

(65) Prior Publication Data
US 2014/0228200 A1   Aug. 14, 2014

(30) Foreign Application Priority Data
Sep. 26, 2011  (JP) ................. 2011-208709

(51) Int. Cl.
| | |
|---|---|
| B01J 21/00 | (2006.01) |
| H01M 4/86 | (2006.01) |
| H01M 4/88 | (2006.01) |
| C09D 11/52 | (2014.01) |
| H01M 4/92 | (2006.01) |

(52) U.S. Cl.
CPC ............. *H01M 4/8652* (2013.01); *C09D 11/52* (2013.01); *H01M 4/8657* (2013.01); *H01M 4/88* (2013.01); *H01M 4/8828* (2013.01); *H01M 4/8663* (2013.01); *H01M 4/92* (2013.01); *H01M 4/926* (2013.01); *Y02E 60/50* (2013.01); *Y02E 60/523* (2013.01)

(58) Field of Classification Search
CPC ............ B01J 21/00; B01J 23/00; B01J 25/00; B01J 29/00
USPC ......................................................... 502/100
See application file for complete search history.

(56) References Cited

U.S. PATENT DOCUMENTS

2004/0028992 A1   2/2004   Jaouen

FOREIGN PATENT DOCUMENTS

| | | |
|---|---|---|
| CN | 1471740 A | 1/2004 |
| EP | 1338053 B1 | 6/2011 |
| JP | 2003-282067 A | 10/2003 |
| JP | 2004-512652 A | 4/2004 |
| JP | 2004-281305 A | 10/2004 |
| JP | 2006-286329 A | 10/2006 |
| JP | 2011-222192 A | 11/2011 |

OTHER PUBLICATIONS

Communication and Extended European Search Report, dated Jan. 28, 2015, from the corresponding European Patent Application No. 12834690.5.

*Primary Examiner* — Edward Johnson
(74) *Attorney, Agent, or Firm* — Young Basile Hanlon & MacFarlane P.C.

(57) ABSTRACT

A catalytic ink preparation method comprises mixing a first ion conducting body and a catalyst, preparing a first ink, and concentrating the first ink. The method is characterized by further comprising a step of adding a second ion conducting body to the concentrated first ink. With such a catalytic ink preparation method, the quantity of solvent in the first ion conducting body is reduced by concentration. In other words, the first ion conducting body adheres to the catalyst, and re-dissolution is not prone to occurring with the first ion conducting body when the second ion conducting body is added. Thus, it is possible to efficiently manufacture an electrode catalyst in which a significant part of the surface of the catalyst is covered with two ionomer layers, and there is almost no portion which is covered with only one ionomer layer.

10 Claims, 1 Drawing Sheet

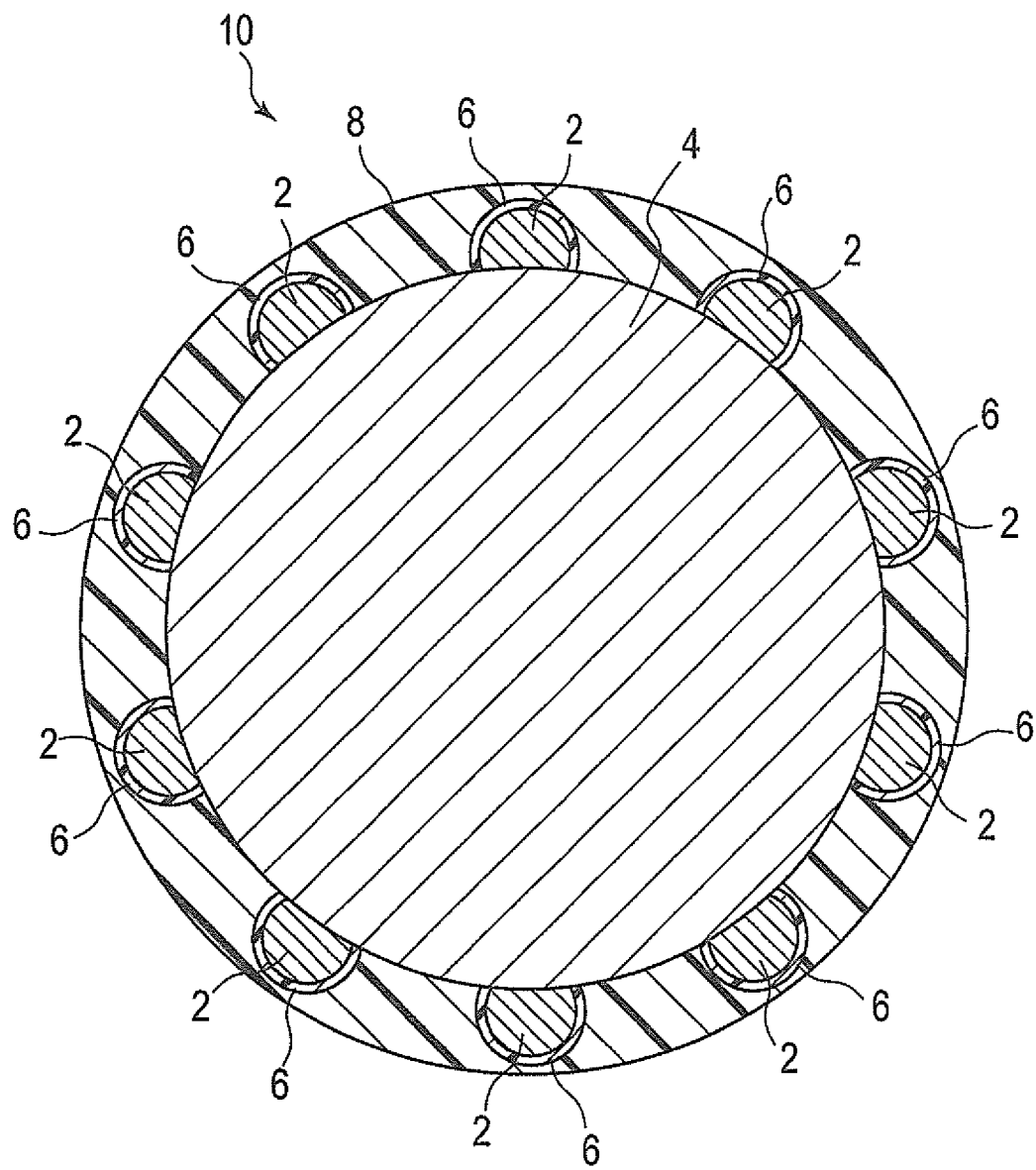

CATALYTIC INK PREPARATION METHOD

CROSS REFERENCE TO RELATED APPLICATION

The present application claims priority to Japanese Patent Application No. 2011-208709, filed Sep. 26, 2011, incorporated herein in its entirety.

TECHNICAL FIELD

The present invention relates to a catalytic ink preparation method.

BACKGROUND

Recently, a fuel cell capable of achieving high output performance with a smaller quantity of catalyst has been sought from the viewpoint of reduction in manufacturing costs for fuel cells. A fuel cell having a catalyst component covered around its periphery with two different types of ionomers has been proposed as one solution for this problem. Such a fuel cell has an increased area of contact of the catalyst component with the ionomers thereby to permit effective utilization of catalysts present within pores in an electrically conductive substrate. As a result, it is recognized that this enables the performance of the catalyst to be fully utilized to thus achieve high output performance.

A fuel cell as described above has been proposed for example in Patent Literature 1, as given below. Specifically, Japanese Patent Application Publication No. 2004-281305 proposes a fuel cell having an electrode catalyst in which a first hydrogen ion conductive polymer electrolyte whose unit element piece has a small size is arranged in the vicinity of conductive carbon particles, and a second hydrogen ion conductive polymer electrolyte whose unit element piece has a large size is arranged on the outside of the first hydrogen ion conductive polymer electrolyte.

SUMMARY

Incidentally, the electrode catalyst described in Japanese Patent Application Publication No. 2004-281305 is manufactured by a manufacturing method as given below. First, a first process is performed; specifically, a first dispersion in which a first hydrogen ion conductive polymer electrolyte is dispersed is deposited on conductive carbon particles supporting a catalytic metal, followed by drying to obtain catalyst particles. After that, a second process is performed; specifically, the catalyst particles are pulverized and, further, the catalyst particles are mixed with a second dispersion in which a second hydrogen ion conductive polymer electrolyte is dispersed, thereby to prepare ink for catalyst layer. Further, a third process is performed; specifically, the ink for catalyst layer is applied to a polymer electrolyte membrane or a supporting sheet, followed by drying to form a catalyst layer.

In the above-described manufacturing method of Japanese Patent Application Publication No. 2004-281305, however, the pulverization of the catalyst particles performed after the first process renders the first hydrogen ion conductive polymer electrolyte uncovered in a portion of the surface of the catalyst particles. Consequently, the final resulting catalyst particles have a portion which is not provided with intended two ionomer layers to be formed, but is covered with only one ionomer layer, specifically, a layer of the second hydrogen ion conductive polymer electrolyte. It is therefore difficult to say that the fuel cell as described above enables the performance of the catalyst to be fully utilized, and there is still room for improvement for the purpose of achieving a fuel cell having higher output performance.

Therefore, an object of the present invention is to provide means for obtaining catalytic ink capable of efficiently manufacturing an electrode catalyst in which a significant part of the surface of the catalyst is covered with two ionomer layers and there is little portion covered with only one ionomer layer.

A catalytic ink preparation method according to an aspect of the present invention includes: mixing a first ion conductor and a catalyst to prepare a first ink; and concentrating the first ink. The method further includes the step of adding a second ion conductor to the concentrated first ink.

Also, a method for manufacturing an electrode catalyst according to another aspect of the present invention uses catalytic ink obtained by the catalytic ink preparation method of the present invention.

BRIEF DESCRIPTION OF DRAWINGS

The description herein makes reference to the accompanying drawings wherein like reference numerals refer to like parts throughout the several views, and wherein:

FIG. 1 is a schematic view illustrating an example of an electrode catalyst obtained by catalytic ink.

DESCRIPTION OF EMBODIMENTS

A catalytic ink preparation method of the present invention will be described in further detail below according to the order of processes. It is to be noted that the sign "%" as employed herein represents a percentage by mass unless otherwise specified. Also, dimensional ratios in the drawing are exaggerated for convenience of explanation and may be different from actual ratios.

[Preparation of First Ink]

In this process, first ink is prepared by mixing a first ion conductor and a catalyst.

The first ion conductor is not particularly limited, and any of an ion conductive polymer having anion conductivity and an ion conductive polymer having cation conductivity may be used. Also, it is preferable that the first ion conductor have water and gas permeability.

Various resins capable of transporting anions such as hydroxide ions ($OH^-$), for example, are available for use as the ion conductive polymer having anion conductivity. More specifically, examples of the resins include styrene-vinylbenzyltrialkylammonium copolymers, N,N-dialkylalkyleneammonium, polyvinylbenzyltrialkylammonium (PVBTMA), polyvinylalkyltrialkylammonium, and alkylene-vinylalkylenetrialkylammonium copolymers. Among them, the styrene-vinylbenzyltrialkylammonium copolymers or PVBTMA is preferably used because of having superior chemical stability.

Various resins capable of transporting cations such as hydrogen ions ($H^+$), for example, are available for use as the ion conductive polymer having cation conductivity. More specifically, examples of the resins include sulfonic acid resins, phosphonic acid resins, carboxylic acid resins, and imide resins.

Examples of the sulfonic acid resins include tetrafluoroethylene-perfluorovinylether sulfonic acid copolymers, polystyrene sulfonic acids, crosslinked polystyrene sulfonic acids, ethylene tetrafluoroethylene copolymers-g-polystyrene sulfonic acids, sulfonated polyarylene etheretherketone, sulfonated polyarylene ether sulfone, polytrifluorostyrene sulfonic acids, sulfonated poly(2,3-diphenyl-1,4-phenylene oxide) resins, sulfonated polybenzyl silane resins, sulfonated polyimide resins, polyvinyl sulfonic acids, sulfonated phenol resins, and sulfonated polyamide resins. Incidentally, the tetrafluoroethylene-perfluorovinylether sulfonic acid copolymers include Nafion (which is a registered trademark and is available from Du Pont), Aciplex (which is a registered trademark and is available from Asahi Kasei Chemicals Corporation), and Flemion (which is a registered trademark and is available from Asahi Glass Co., Ltd.).

Examples of the phosphonic acid resins include tetrafluoroethylene-perfluorovinylether phosphonic acid copolymers, polystyrene phosphonic acids, crosslinked polystyrene phosphonic acids, polyvinyl benzyl phosphonic acids, ethylene tetrafluoroethylene copolymers-g-polystyrene phosphonic acids, phosphonated polyarylene etheretherketone, phosphonated polyarylene ether sulfone, polytrifluorostyrene phosphonic acids, phosphonated poly(2,3-diphenyl-1,4-phenylene oxide) resins, phosphonated polybenzyl silane resins, phosphonated polyimide resins, polyvinyl phosphonic acids, phosphonated phenol resins, phosphonated polyamide resins, and polybenzimidazole phosphoric acid composite resins.

Examples of the carboxylic acid resins include tetrafluoroethylene-perfluorovinylether carboxylic acid copolymers, polyvinyl benzoic acids, crosslinked polyvinyl benzoic acids, ethylene tetrafluoroethylene copolymers-g-polyvinyl benzoic acids, carboxylated polyarylene etheretherketone, carboxylated polyarylene ether sulfone, polytrifluorostyrene carboxylic acids, carboxylated poly(2,3-diphenyl-1,4-phenylene oxide) resins, carboxylated polybenzyl silane resins, and carboxylated polyimide resins.

Examples of the imide resins include tetrafluoroethylene-perfluorovinylether sulfonimide acid copolymers, and polystyrene trifluoromethyl sulfonimide.

Among these, it is preferable to use Nafion (which is the registered trademark and is available from Du Pont), Aciplex (which is the registered trademark and is available from Asahi Kasei Chemicals Corporation), or Flemion (which is the registered trademark and is available from Asahi Glass Co., Ltd.).

Preferably, the ion conductive polymer having cation conductivity is made up of a resin of the same type as a resin for use in an electrolyte membrane. The resin of the same type as that for the electrolyte membrane is arranged in an electrode for fuel cell thereby to achieve good properties of adhesion between the electrode for fuel cell and the electrolyte membrane and hence improve hydrogen-ion conductivity, in particular. Therefore, it is preferable that the ion conductive polymer having cation conductivity be selected as appropriate, taking into account the type of the electrolyte membrane to be used.

Next, description will be given of catalyst components.

A catalyst component for use in an anode-side catalyst layer is not particularly limited, provided that it acts to catalyze oxidation of hydrogen, and a known catalyst may be used in a known form. Also, a catalyst component for use in a cathode-side catalyst layer is not particularly limited, provided that it acts to catalyze reduction of oxygen, and a known catalyst may be used in a known form. Specifically, the catalyst components are selected from metals such as platinum, ruthenium, iridium, rhodium, palladium, osmium, tungsten, lead, iron, chromium, cobalt, nickel, manganese, vanadium, molybdenum, gallium, and aluminum, and their alloys, and the like. Of course, the catalyst components are not so limited, and other materials may be used. Incidentally, among these, it is preferable that a material containing at least platinum be used in order to improve catalytic activity, toxic resistance to carbon monoxide or the like, heat resistance, or the like. Preferably, the composition of the above-described alloys is such that the alloys contain 30 to 90 atom % of platinum, and 10 to 70 atom % of metal alloyed, depending on the type of the metal alloyed. In a case where an alloy is used as the cathode-side catalyst, the composition of the alloy varies according to the type of metal alloyed or the like and may be selected as appropriate by those skilled in the art; however, it is preferable that the alloy contain 30 to 90 atom % of platinum, and 10 to 70 atom % of other metal alloyed. Incidentally, "alloy" refers generally to matter obtained by adding one or more kinds of metallic elements or non-metallic elements to a metallic element, and is a generic term for substances having metallic properties. Structures of the alloy include a eutectic alloy as what is called a mixture of constituent elements which form separate crystals, a solid solution into which constituent elements completely melt together, and an intermetallic compound or a compound of metal with non-metal formed by constituent elements, and any of these structures may be used in the invention of the present application. A catalyst component for use in an anode catalyst layer and a catalyst component for use in a cathode catalyst layer can be determined by being selected as appropriate from among the above-described substances. Incidentally, herein, description of the catalyst components for the anode catalyst layer and the cathode catalyst layer is common to both unless otherwise specified, and these catalyst components are collectively called the "catalyst components." However, the catalyst components for the anode catalyst layer and the cathode catalyst layer are not required to be identical but are selected as appropriate so as to effect a desired action as described above.

The shape and size of the catalyst are not particularly limited, and a catalyst having the same shape and size as a known catalyst may be used; however, it is preferable to use a catalyst in particulate form. In this case, an average particle diameter of catalyst particles is preferably 1 to 30 nm, more preferably 1.5 to 20 nm, still more preferably 2 to 10 nm, or particularly preferably 2 to 5 nm. When the average particle diameter of the catalyst particles has a value within the above-described range, it is possible to properly control a balance between catalyst utilization and simplicity and ease of supporting related to an effective electrode area in which an electrochemical reaction proceeds. Incidentally, "the average particle diameter of the catalyst particles" as employed in the present invention can be measured by calculating an average value of crystallite diameters determined from a half-width of a diffraction peak of the catalyst components obtained by X-ray diffraction or particle diameters of the catalyst components examined by a transmission electron microscope image.

An electrically conductive substrate functions as a substrate for supporting the above-mentioned catalyst components, and as an electron conductive path involved in the transfer of electrons to the catalyst components.

Anything may be used as the electrically conductive substrate, provided that it has a specific surface area to support the catalyst components in a desired dispersed state and has sufficient electron conductivity, and it is preferable to use a carbon base material having carbon as a main ingredient. Specifically, the carbon base materials include carbon black, graphitized carbon black, active carbon, coke, natural graphite, artificial graphite, and carbon particles formed of carbon nanotube, carbon nanohorn and carbon fibril structures and the like. Incidentally, the expression "having carbon as a main ingredient" means "to contain carbon atoms as a main ingredient," and corresponds to a concept including both the meaning "to be made up of carbon atoms alone" and the meaning "to be made up substantially of carbon atoms." In some cases, an element other than the carbon atoms may be contained in order to improve characteristics of a fuel cell. Incidentally, the expression "to be made up substantially of carbon atoms" means that the inclusion of about 2 to 3% by mass or less of impurities is permissible.

A BET nitrogen specific surface area of the electrically conductive substrate may have any value, provided that it is a specific surface area sufficient to support the catalyst components in a highly dispersed state; however, the specific surface area is preferably 20 to 1600 $m^2/g$, or more preferably 80 to 1200 $m^2/g$. When the specific surface area of the electrically conductive substrate has a value within such a range, it is possible to properly control a balance between dispersion properties of the catalyst components on the electrically conductive substrate and effective utilization of the catalyst components.

Although the size of the electrically conductive substrate is also not particularly limited, it is preferable that an average particle diameter thereof be 5 to 200 nm from the viewpoint of control of the simplicity and ease of supporting, the catalyst utilization and the thickness of an electrode catalyst layer within a proper range, or the like. More preferably, the average particle diameter is 10 to 100 nm. Incidentally, the average particle diameter of the electrically conductive substrate can also be measured in the same manner as the above-described average particle diameter of the catalyst particles.

In the electrode catalyst, the amount of catalyst components supported is preferably 10 to 80% by mass, or more preferably 30 to 70% by mass, relative to the total amount of the electrode catalyst. When the amount of catalyst components supported has a value within the above-described range, it is possible to properly control a balance between a degree of dispersion of the catalyst components on the electrically conductive substrate and performance capabilities of the catalyst. Incidentally, the amount of catalyst components supported can be measured by inductively coupled plasma emission spectrometry (ICP).

Also, a known method may be used to support the catalyst components on the substrate. A known method such for example as impregnation method, liquid phase reduction supporting method, evaporation-to-dryness method, colloid adsorption method, spray pyrolysis method, or reversed micelle method (or microemulsion method) may be used.

A commercially available product may be used as the electrode catalyst. An electrode catalyst available from Tanaka Kikinzoku Kogyo K.K., N.E. CHEMCAT Corporation, E-TEK Corporation, Johnson Matthey Corporation or the like, for example, may be used as the commercially available product. These electrode catalysts are each formed of a carbon substrate, and platinum or platinum alloy supported on the carbon substrate, and the concentration of catalyst species supported is 20 to 70% by mass. In the above description, the carbon substrates include Ketjen black, vulcan, acetylene black, black pearl, carbon nanotube, carbon nanohorn, carbon fiber, and mesoporous carbon. Also, a graphitized carbon substrate heat-treated beforehand at high temperature, for example, graphitized Ketjen black, may be used.

Specific examples of devices for use in this process include known devices such as an ultrasonic pulverizer, a homogenizer, a thin film revolution type high-speed mixer, a spray dryer, a ball mill, a planetary ball mill, a bead mill, and a sand mill. Also, a Thinky mixer of rotation and revolution mixer type (available from Thinky Corporation) may be used. Among these, it is preferable to use the ball mill, the planetary ball mill, the bead mill, or the sand mill.

In a case where these preferable devices are used, the mixing of the catalyst and the first ion conductor and the pulverization of the catalyst are simultaneously performed. When the mixing and the pulverization are simultaneously performed, there is a tendency as given below, in particular; specifically, little or no part which is not covered with the first ion conductor appears in the catalyst components. As a result, the catalyst having two intended ionomer layers can be more efficiently obtained.

A mixed solvent for use in the mixing of the catalyst and the first ion conductor is not particularly limited. Examples of the mixed solvent include water, alcohols such as methanol, ethanol, propanol, and butanol, polar solvents such as N,N'-dimethylacetamide, N,N'-dimethylformamide, dimethyl sulfoxide, and sulfolane, and cyclic ethers such as tetrahydrofuran. Although these can be used singly, a mixture of two or more kinds of solvents may be used. Among these, it is preferable to use singly water or lower alcohol such as ethanol, 1-propanol or 2-propanol, or use a mixture of two or more kinds of these solvents, from the viewpoint of working environment or the like.

The order in which the mixing of the catalyst components and the first ion conductor is performed is not particularly limited. However, it is preferable from a safety standpoint to obtain a dispersion of the catalyst components in water or a mixed solvent containing water and thereafter add the first ion conductor or a dispersion of the first ion conductor in water or a mixed solvent containing water.

Although mixing time is not particularly limited, it is preferable that the mixing time be 1 to 240 minutes. Although mixing temperature is also not particularly limited, it is preferable that the mixing temperature be 0 to 50° C.

After the mixing, media such as balls or beads may be added to the ink to perform cracking, as needed. After the cracking by the media has been performed, the media are separated and recovered from the ink by tilt filtration or the like.

Preferably, a solid content concentration of the first ink obtained by this process, or equivalently, the total concentration of the first ion conductor and the catalyst, is 1 to 35% by mass. Incidentally, the solid content concentration of the first ink is more preferably 3 to 25% by mass, or still more preferably 5 to 20% by mass.

[Concentrating of First Ink]

In this process, the first ink obtained by the above-described mixing process is concentrated. This reduces the quantity of solvent in the first ion conductor, thus making it easy for the first ion conductor to adhere to the catalyst. As a result, re-dissolution of the first ion conductor is not prone to occur during a process of adding a second ion conductor to be described later. Thus, desorption of the first ion conductor from the catalyst component is not prone to occur, so that the catalyst having the two intended ionomer layers can be efficiently obtained.

Here, the concentrating performed by this process means that the solid content concentration of the first ink obtained by the above-described mixing process is increased without drying. Here, the expression "without drying" has the meaning "without increasing the solid content concentration to 93% by mass or more." More specifically, it is preferable that the process be performed so that the solid content concentration of the first ink after the concentrating becomes 25 to 90% by mass. Such a range of solid content concentrations effects sufficient adhesion of the first ion conductor to the catalyst. As a result, the following catalytic ink preparation performed by re-dispersing the catalyst in the solvent becomes easier. More specifically, the solid content concentration is set equal to or more than 25% by mass thereby to facilitate the sufficient adhesion of the first ion conductor to the catalyst. Also, the solid content concentration is set equal to or less than 90% by mass thereby to facilitate particularly re-dispersion of the concentrated first ink in a dispersion containing the second ion conductor, thus enabling more uniform covering with the second ion conductor. From this viewpoint, the solid content concentration of the first ink after the concentrating is more preferably 30 to 50% by mass, or still more preferably 31 to 38% by mass.

A concentrating method is not particularly limited, and a heretofore known method such for example as suction filtration, reduced-pressure distillation, heating distillation, centrifugation, precipitation separation, or dialysis separation is used. Also, a device for use in the concentrating is not particularly limited, and a heretofore known device such for example as a suction filter, a rotary evaporator, a centrifugal separator, or a dialyzer is used.

[Addition of Second Ion Conductor]

In this process, catalytic ink containing the catalyst covered with two ionomer layers is obtained by adding the second ion conductor to the concentrated first ink. By this process, the catalyst covered with the first ion conductor contained in the first ink is further covered with the second ion conductor. As a result, a significant part of the surface of the catalyst contained in the catalytic ink of this embodiment is covered with two layers of the first ion conductor and the second ion conductor. When such catalytic ink is used to manufacture an electrode catalyst, the electrode catalyst exhibits excellent ion conductivity. Thus, it can be safely said that the electrode catalyst delivers its full performance and hence contributes to an output improvement in a fuel cell to which the electrode catalyst is applied.

Preferably, here, stirring operation is performed as given below, after the above-described process has been performed to add the second ion conductor or add the second ion conductor and the solvent. Specifically, it is preferable that the stifling operation be performed so that at least one of values of a mean volume diameter and an mean area diameter based on a particle size distribution of the catalyst covered with the first ion conductor after the stirring is equal to or smaller than a value before the process of concentrating is performed. Such stirring operation is performed thereby to enable making the particle diameter of the catalyst aggregated by the concentration equal to or smaller than the particle diameter before the aggregation, while suppressing exposure of the surface of the catalyst which is not covered with the first ion conductor. As a result, the covering of the catalyst with the first ion conductor can be kept constant. From this viewpoint, the stirring operation is not limited to being performed at the time as described above, and it is more preferable that the stirring operation be performed before the addition of the second ion conductor.

Detailed description will be given below with regard to the above description "at least one of values of a mean volume diameter and an mean area diameter based on a particle size distribution of the catalyst covered with the first ion conductor after the stifling is equal to or smaller than a value before the process of concentrating is performed." Specifically, at least one of the mean volume diameter based on the particle size distribution of the catalyst covered with the first ion conductor, and the mean area diameter based on the particle size distribution of the catalyst covered with the first ion conductor, before the above-described process of concentrating is performed, is determined. Further, at least one of the mean volume diameter based on the particle size distribution of the catalyst covered with the first ion conductor, and the mean area diameter based on the particle size distribution of the catalyst covered with the first ion conductor, after the stirring, is determined. When these are compared, a predetermined average diameter value of the catalyst after the stifling is equal to or smaller than a predetermined average diameter value of the catalyst before the process of concentrating is performed. This is the meaning of the above description. Incidentally, it is more preferable that the above-described stirring operation be performed so that at least one of the values of the mean volume diameter and the mean area diameter based on the particle size distribution of the catalyst covered with the first ion conductor after the stirring is smaller than the value before the process of concentrating is performed.

Incidentally, herein, values determined through the same measuring procedure by using a measuring device of the same type using laser diffraction scattering method are adopted as the particle size distribution of the catalyst before the above-described concentrating process and the particle size distribution of the catalyst after the above-described stirring process. Although the catalytic ink before the above-described concentrating process and the catalytic ink after the above-described stirring process may be diluted with the same solvent to the same solid content concentration to obtain diluted catalytic ink, they may also be compared in the form of undiluted catalytic ink. Water or lower alcohol such as ethanol, 1-propanol or 2-propanol may be used singly as the above-described solvent, or a mixture of two or more kinds of these solvents, or the like may be used.

Incidentally, the "mean volume diameter" refers to an average diameter weighted with volume. Specifically, a value calculated by Equation (1) is adopted as a mean volume diameter MV:

$$MV = \Sigma(v_i \cdot d_i) / \Sigma v_i \qquad (1)$$

where $v_i$ represents the volume of the i-th particle of n particles $(1, 2, \ldots, n)$, and $d_i$ represents the particle diameter of the i-th particle of n particles $(1, 2, \ldots, i, \ldots, n)$.

Further, the "mean area diameter" refers to an average diameter weighted with area. Specifically, a value calculated by Equation (2) is adopted as a mean area diameter MA:

$$MA = \Sigma(a_i \cdot d_i) / \Sigma a_i \qquad (2)$$

where $a_i$ represents the surface area of the i-th particle of n particles $(1, 2, \ldots, i, \ldots, n)$, and $d_i$ represents the particle diameter of the i-th particle of n particles $(1, 2, \ldots, i, \ldots, n)$.

Examples of a more specific method for performing such stifling include a method which involves first adding a solvent to a solid content obtained by concentrating the first ink, and then performing the stirring by using a device such as a homogenizer or a thin film revolution type high-speed mixer. Examples of a form of stirring include medialess stifling.

Although the type of the solvent added before the stifling is not particularly limited, it is preferable that the type of the solvent be selected as appropriate according to a combination of the first ion conductor and the second ion conductor. For instance in a case where both the first ion conductor and the second ion conductor have cation conductivity, examples of the solvent used in this case include water, and lower alcohols such as ethanol, 1-propanol, and 2-propanol, which may be used singly or in the form of a mixture of two or more kinds of these solvents. Also, in a case where the first ion conductor has anion conductivity and the second ion conductor has cation conductivity, examples of the solvent used in this case include water, and lower alcohols such as ethanol, 1-propanol, and 2-propanol, which may be used singly or in the form of a mixture of two or more kinds of these solvents.

Although the amount of solvent added is not particularly limited, it is preferable that the amount of solvent added be 300 to 3000% of the mass of the first ink after the concentrating.

Although stirring time is not particularly limited, it is preferable that the stifling time be 15 to 30 minutes. Also, although ink temperature during the stifling is not particularly limited, it is preferable that the ink temperature be 5 to 15° C.

The second ion conductor added is not particularly limited, provided that it has cation conductivity; however, it is preferable that the second ion conductor be an ion conductive polymer having cation conductivity. Also, it is preferable that the second ion conductor have water and gas permeability. Since more specific examples are as described in the earlier section "Preparation of First ink," description of them will be omitted here.

Preferably, the amount of the second ion conductor added is 10 to 130% by mass relative to the mass of the catalyst substrate. Also, the amount of the second ion conductor added is more preferably 20 to 90% by mass, or still more preferably 30 to 60% by mass.

Incidentally, stifling may be performed as needed during and after the addition of the second ion conductor or a dispersion of the second ion conductor in water or a mixed solvent containing water. In this case, it is preferable that the stifling be medialess stirring. Since examples of a device for use in the medialess stifling are the same as those described above, description of them will be omitted here. In this case, stifling time and stirring temperature are not particularly limited, and it is preferable by way of example that the stirring time be 5 to 10 minutes, and that the ink temperature during the stifling be 5 to 15° C. Incidentally, the solvent may be added as needed after the above-described medialess stirring.

An electrode catalyst layer containing an electrode catalyst can be obtained by using the catalytic ink obtained by the above-described catalytic ink preparation method. Heretofore known findings may be adopted as appropriate to manufacture the electrode catalyst layer containing the electrode catalyst. One example is a method which involves applying a coating of the catalytic ink to a solid polymer electrolyte membrane by using a heretofore known method such as spray method, transfer method, doctor blade method, or die coating method, and drying the coating of the catalytic ink.

The amount of catalytic ink applied is not particularly limited, provided that the amount is such that the electrode catalyst can exhibit a sufficient catalytic activity for catalyzing an electrochemical reaction. Preferably, the coating of the catalytic ink is applied so that the mass of the catalyst components per unit area be 0.05 to 1 mg/cm$^2$. Also, it is preferable that the coating of the catalytic ink be applied so that the thickness of the catalytic ink applied is 5 to 30 μm after the drying. Incidentally, the above-described amounts and thicknesses of catalytic ink applied on the anode side and the cathode side are not required to be equal but may be prepared as appropriate.

FIG. 1 is a schematic view illustrating an example of the electrode catalyst obtained by the above-described catalytic ink. As illustrated in FIG. 1, the electrode catalyst includes an electrode material 10. Then, the electrode material 10 includes catalyst components formed of catalyst particles 2 supported on an electrically conductive substrate 4, and ion conductors which cover the catalyst components. Incidentally, the electrode material 10 includes a first ion conductor 6 having anion conductivity, and a second ion conductor 8 having cation conductivity, as the ion conductors.

The first ion conductor 6 is provided to cover the catalyst particles 2, and the second ion conductor 8 is provided to cover exposed portions of the first ion conductor 6 and the electrically conductive support 4.

A method for manufacturing a fuel cell having the above-described electrode catalyst layer is not particularly limited, and the manufacture of the fuel cell can be achieved by referring to heretofore known findings in the field of fuel cells as appropriate.

The fuel cells include a polymer electrolyte type fuel cell, an alkaline type fuel cell, a direct methanol type fuel cell, and a micro fuel cell. The electrode catalyst layer containing the above-described electrode catalyst may be applied to any of the above-described cells.

While the contents of the present invention have been described above with reference to the embodiment, it is obvious to one of ordinary skill in the art that the present invention is not limited to these descriptions and various modifications and improvements could be made thereto.

According to the present invention, a catalytic ink preparation method includes the steps of: mixing a first ion conductor and a catalyst thereby to prepare first ink; and concentrating the first ink. This step of concentrating reduces the quantity of solvent in the first ion conductor. Thus, the first ion conductor adheres to the catalyst, and re-dissolution of the first ion conductor is not prone to occur during addition of a second ion conductor. Thus, desorption of the first ion conductor from a catalyst component is not prone to occur, so that the catalyst having two ionomer layers can be efficiently obtained after the addition of the second ion conductor.

The invention claimed is:

1. A catalytic ink preparation method comprising:
  mixing a first ion conductor and a catalyst to prepare a first ink;
  concentrating the first ink; and
  adding a second ion conductor to the concentrated first ink.

2. The catalytic ink preparation method according to claim 1, wherein the concentrating the first ink is performed so that a solid content concentration of the first ink becomes 25 to 90% by mass.

3. The catalytic ink preparation method according to claim 1, further comprising: stirring the concentrated first ink before adding the second ion conductor,
  wherein the stirring is performed so that at least one of values of a mean volume diameter and a mean area diameter based on a particle size distribution of the catalyst covered with the first ion conductor after the stirring is equal to or smaller than the value before the concentrating the first ink is performed.

4. A method for manufacturing the electrode catalyst, using the catalytic ink obtained by the preparation method according to claim 1.

5. The catalytic ink preparation method according to claim 1, wherein the concentrating the first ink reduces a quantity of solvent in the first ion conductor.

6. The catalytic ink preparation method according to claim 2, wherein the concentrating the first ink increases the solid content concentration of the first ink.

7. The catalytic ink preparation method according to claim 6, wherein the concentrating the first ink increases the solid content concentration of the first ink from between 3% and 25% by mass to greater than 25% by mass.

8. The catalytic ink preparation method according to claim 7, wherein the concentrating the first ink increases the solid content concentration of the first ink from between 5% and 20% by mass.

9. The catalytic ink preparation method according to claim 7, wherein the concentrating the first ink increases the solid content concentration of the first ink to between 30% and 50% by mass.

10. The catalytic ink preparation method according to claim 9, wherein the concentrating the first ink increases the solid content concentration of the first ink to between 31% and 38% by mass.

* * * * *